US009560315B1

(12) United States Patent
Silberman et al.

(10) Patent No.: US 9,560,315 B1
(45) Date of Patent: Jan. 31, 2017

(54) REDUCING VIDEOCONFERENCING BANDWIDTH USAGE

(71) Applicant: Dell Software, Inc., Round Rock, TX (US)

(72) Inventors: Gabriel M. Silberman, Austin, TX (US); Daniel A. Ford, Mount Kisco, NY (US)

(73) Assignee: Dell Software, Inc., Round Rock, TX (US)

( * ) Notice: Subject to any disclaimer, the term of this patent is extended or adjusted under 35 U.S.C. 154(b) by 0 days.

(21) Appl. No.: 14/960,566

(22) Filed: Dec. 7, 2015

(51) Int. Cl.
*H04N 7/14* (2006.01)
*H04N 7/15* (2006.01)

(52) U.S. Cl.
CPC ............... *H04N 7/147* (2013.01); *H04N 7/15* (2013.01)

(58) Field of Classification Search
CPC combination set(s) only.
See application file for complete search history.

(56) References Cited

U.S. PATENT DOCUMENTS

| 6,714,205 | B1* | 3/2004 | Miyashita | G06T 3/4038 345/530 |
| 2003/0077002 | A1* | 4/2003 | Silverstein | H04N 21/2662 382/282 |
| 2009/0137277 | A1* | 5/2009 | Oh | H04M 1/576 455/564 |
| 2009/0319570 | A1* | 12/2009 | Subramanian | G06F 17/30244 |
| 2012/0002601 | A1* | 1/2012 | Underwood | H04L 12/581 370/328 |
| 2014/0368536 | A1* | 12/2014 | Ao | G06T 1/60 345/629 |

\* cited by examiner

*Primary Examiner* — Joseph J Nguyen
(74) *Attorney, Agent, or Firm* — Campbell Stephenson LLP; Shiv S. Naimpally

(57) ABSTRACT

Systems and techniques to reduce bandwidth usage of video frames in a videoconferencing system are described. A computing device may receive a first frame of a first video stream from an imaging device and decompose the frame into a plurality of portions. The computing device may select a first portion of the plurality of portions, determine that the first portion matches a sent portion in a sent catalog, determine a first identifier associated with the first portion, and send the first identifier to a server. The computing device may select a second portion of the plurality of portions, determine that the second portion fails to match any of the sent portions in the sent catalog, create and associate a second identifier with the second portion, store the second portion with the second identifier in the sent catalog, and send the second portion to the server.

20 Claims, 8 Drawing Sheets

REDUCING VIDEOCONFERENCING BANDWIDTH USAGE

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Videoconferencing may use large amounts of data transmission bandwidth to transmit multiple video streams (e.g., streams of images). However, transmitting video streams that are perceived by participants as being good quality video may be expensive in terms of bandwidth costs and monetary costs. In addition, most data transmission mediums have a fixed amount of bandwidth that is shared by multiple users with multiple data streams (e.g., voice data, video data, audio data, text data, etc.). Therefore, when multiple data streams are being transmitted using a fixed amount of bandwidth, video streams used in videoconferencing may suffer quality degradation due to lack of available bandwidth.

SUMMARY

This Summary provides a simplified form of concepts that are further described below in the Detailed Description. This Summary is not intended to identify key or essential features and should therefore not be used for determining or limiting the scope of the claimed subject matter.

Systems and techniques to reduce bandwidth usage of video frames in a videoconferencing system are described. A computing device may receive a first frame of a first video stream from an imaging device and decompose the frame into a plurality of portions. The computing device may select a first portion of the plurality of portions, determine that the first portion matches a sent portion in a sent catalog, determine a first identifier associated with the first portion, and send the first identifier to a server. The computing device may select a second portion of the plurality of portions, determine that the second portion fails to match any of the sent portions in the sent catalog, create and associate a second identifier with the second portion, store the second portion with the second identifier in the sent catalog, and send the second portion to the server.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
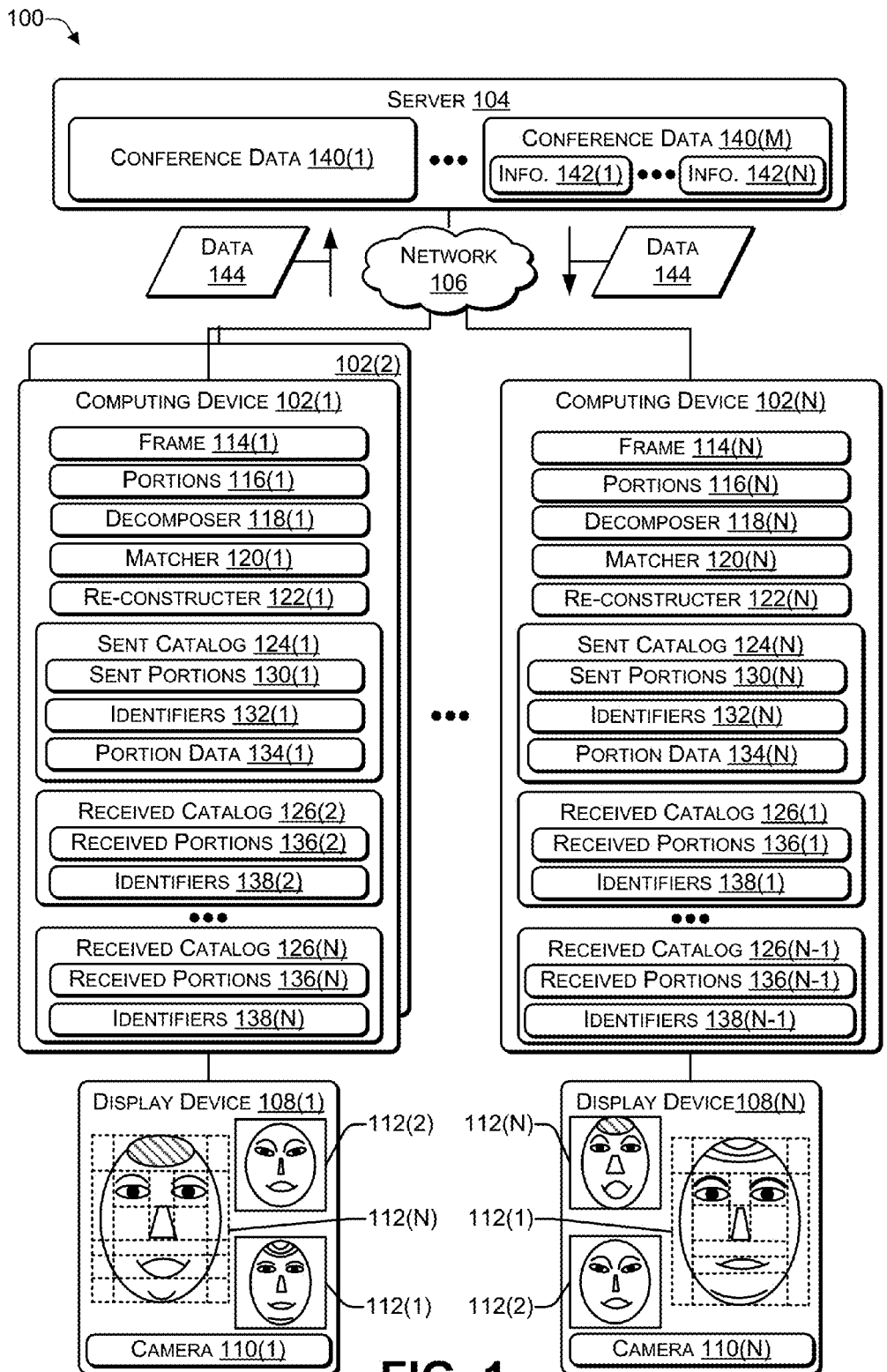
FIG. 1 is a block diagram illustrating a computing system in which portions of a frame are transmitted according to some embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

The systems and techniques described herein may enable reduction in an amount of bandwidth used when transmitting and receiving video streams associated with videoconferencing. As used herein, the term "video stream" may refer to a sequence of video frames (e.g., images) and may include an audio stream. The video stream may comply with a video streaming standard, such as session initiation protocol (SIP), H.323, H.320, H.264, high efficiency video codec (HEVC), or other standard. For example, a video camera (or other image capture device) may capture a frame of a video stream (e.g., an image) and send the frame to a computing device.

A software application executing on the computing device may decompose the frame into multiple portions. The software application may select a portion and determine if the portion matches a stored portion in a set of stored portions that are stored in a sent catalog. Each stored portion may have an associated identifier. For example, the identifier may be based on a hash (e.g., fingerprint) of a numerical (e.g., binary, hexadecimal, etc.) representation of the stored portion of the frame. If the portion matches a stored portion, then the software application may send the identifier associated with the stored portion (e.g., instead of sending the portion of the frame) to the videoconferencing server for distribution to the participating devices. The identifier may be relatively smaller in size compared to the portion of the frame. Thus, sending the identifier instead of the portion of the frame may reduce bandwidth usage. If the portion does not match any of the stored portions, then the software application may associate an identifier with the portion of the frame, store the portion and the identifier in the sent catalog, and send the portion of the frame to the videoconferencing server for distribution to the participating devices.

In some cases, the identifier associated with the portion may be sent with the portion. For example, if each participating device in the videoconferencing session uses the same algorithm to derive the identifier from a portion of a frame, then the identifier may not be sent with the portion of the frame. However, in some cases, the identifier may be sent with the portion of the frame to enable the participating devices in the videoconferencing session to synchronize with each other. In addition to reducing bandwidth usage, the systems and techniques described herein may enable videoconferencing sessions to be created when the available bandwidth is relatively small, e.g., in situations where conventional videoconferencing techniques might result in dropped frames. Furthermore, the systems and techniques described herein may reduce latency. For example, in a videoconferencing system, latency may be the time difference between (i) when a frame is captured at a sending device and (ii) when the frame is reconstructed at a receiving device.

Thus, a software application on each device participating in a video conference may maintain a sent catalog that includes stored portions and associated identifiers of images (e.g., video frames) sent to other participating devices. When a new image is received and decomposed into multiple portions, for each portion, the software application may determine whether to send the portion by comparing the portion to stored portions (e.g., previously sent portions) in the sent catalog. If a portion matches a stored portion, the identifier associated with the stored portion is sent instead of sending the portion. If the portion does not match a stored portion, an identifier is associated with the portion, the identifier and the portion are stored in the sent catalog, and the portion is sent to a videoconferencing server.

Each device participating in the video conference may maintain a received catalog associated with each of the other participating devices. The received catalog associated with a particular device of the other participating devices may include portions of images and associated identifiers received from the particular device. The received catalog associated with the particular device may be used to reconstruct frames of a video stream sent from the particular device.

The software application may determine whether the portion of each frame of a video stream differs from a stored portion by less than a threshold amount. In a videoconference session, the participants are typically relatively stationary, such that there may be very little change from one frame to the next frame. For example, when a participant is speaking, the lips may change from one frame to the next frame while the eyes may change every few frames (e.g., when the participant blinks, the eyes may change from open to shut). Thus, the software application may determine whether the portion of the frame matches (e.g., is similar to) a stored portion and may not try to determine an exact match. In addition, in a videoconference with multiple participants, the number of pixels used to display a participant's image may be relatively few compared to the size (in pixels) of the display. Using stored portions that approximately match (rather than exactly match) portions of a frame to reconstruct the frame of the video stream at a receiving device may result in a reconstructed image that is not perceptively different from the original image because of the relatively small number of pixels used to display the reconstructed image.

Each participant device may receive videoconferencing data (e.g., from a video stream) associated with another participating device (e.g., from the videoconferencing server). The software application may maintain a received catalog associated with each of the other participating devices. Each received catalog may include a set of stored portions that were received from another participating device.

A software application executing on each participant device may determine whether the data includes an identifier or a portion of a frame (and in some cases the identifier associated with the portion of the frame). If the data includes an identifier, the software application may use the identifier to retrieve an associated portion of a frame that is stored in the received catalog associated with the sending device (e.g., the computing device that sent the data to the videoconferencing server for distribution to participating devices). If the data includes a portion of a frame, then the software application may determine an associated identifier, e.g., either by retrieving the identifier from the data (if the identifier was sent with the portion) or by calculating the identifier based on the portion of the frame (e.g., by determining a hash or fingerprint of a numerical representation of the portion). The software application may store the portion of the frame and the associated identifier in the received catalog associated with the sending device.

The software application may use the stored portions of the frame in the received catalog to reconstruct a frame sent by the sending device. For example, during a videoconferencing session, a participant may remain relatively stationary and the participant's lips may change from one image to another, while other aspects of the frame may remain the same. In such a situation, after a computing device has sent the portions of a first image to other participating devices, to reconstruct subsequent images, the computing device may send portions of images that include the lips along with the identifiers associated with stored portions of a remainder of the frame to the other participating devices.

In some videoconference systems, when setting up a videoconferencing session between two (or more) devices, a videoconferencing server may determine the identities of the participating devices, setup the videoconference, and enable the two (or more) devices to communicate peer-to-peer, e.g., without further involvement by the videoconferencing server. In other videoconference systems, when setting up a videoconferencing session between two (or more) devices, the videoconferencing server may determine the identities of the participating devices, setup the videoconference, and the video streams associated with each of the participating devices may pass through the videoconferencing server, e.g., without any peer-to-peer communications among the participating devices. The systems and techniques described herein may reduce bandwidth usage in both peer-to-peer and server-centric types of videoconferencing systems by sending identifiers associated with previously sent portions of an image.

A macro identifier may be used to identify two or more portions of a frame. For example, suppose a video stream includes multiple frames in which a participant is smiling and multiple frames in which the participant is frowning. The sending device may keep track of how often a particular set of identifiers is sent, create a macro identifier associated with the particular set of identifiers, and send the macro identifier instead of the particular set of identifiers. For example, the sending device may create a face-minus-lips macro identifier (e.g., associated with identifiers of portions used to reconstruct the participant's face excluding the lips), a smiling lips macro identifier (e.g., associated with identifiers of portions used to reconstruct the lips when the participant is smiling), and a frowning lips macro identifier (e.g., associated with identifiers of portions used to reconstruct the lips when the participant is frowning). To recreate a subsequent frame in which the participant is smiling, the sending device may send the face-minus-lips macro identifier with the smiling lips macro identifier. To recreate a subsequent frame in which the participant is frowning, the sending device may send the face-minus-lips macro identifier with the frowning lips macro identifier. In some cases, the macro identifier may be used to identify enough portions to reconstruct an entire frame. For example, a smiling face macro identifier may be used to identify the stored portions sufficient to reconstruct a frame in which the participant's face is smiling. A frowning face macro identifier may be used to identify the stored portions sufficient to reconstruct a frame in which the participant's face is frowning. Using macros may enable frequently used sets of identifiers to be referenced using a single macro identifier.

Thus, the amount of data to be transferred to support videoconferencing sessions may be reduced by decomposing frames into multiple portions, sending portions that do not match previously sent portions, and reconstructing the frames at participating devices. In videoconferencing, the typical contents of a video stream may include human faces centered in a rectangular frame. During a typical videoconference, the positions of the faces may not change significantly and the background may remain relatively static. Each frame may be segmented by a sending device and reconstructed by a receiving device. Thus, portions of a video frame may be cached and used to reconstruct the video frame at each receiving device. As portions of frames are cached at each participating device, the data stream may include fewer and fewer portions of frames and more identifiers associated with the cached portions. Image stitching software (e.g., photo stitching) may be used to combine multiple portions of a photographic image (e.g., a frame of a video stream) to reconstruct the original image. The reconstructed image may include different portions of a participant's face stitched together from different frames. For example, portions of a first frame that includes a participant's face in which the lips are open may be transmitted from a sending device and cached at a receiving device. For a subsequent frame of a participant's face in which the lips are closed, portions of the subsequent frame that include the lips closed may be transmitted with identifiers associated with remaining portions of the participant's face. The identifiers may be used to retrieve stored (e.g. cached) portions of the participant's face to, along with portions of the frame that include the closed lips, reconstruct the participant's face with closed lips. A smoothing algorithm (or similar type of algorithm) may be used to smooth edges in the reconstructed frame.

FIG. 1 is a block diagram illustrating a computing system 100 in which portions of a frame are transmitted according to some embodiments. The system 100 may include multiple computing devices 102(1) to 102(N) (where N>0) connected to a server 104 via a network 106. For example, the server 104 may include software, hardware, or both to enable the server 104 to manage multiple videoconferencing sessions, including a videoconferencing session between the computing devices 102(1) to 102(N).

The computing devices 102(1) to 102(N) may include a variety of devices, such as, for example, desktop computing devices, laptops, netbooks, tablets, wireless phones, media playback devices, media capture devices, etc. Each of the computing devices 102 may have an associated display device 108. For example, as illustrated in FIG. 1, the computing device 102(1) may have an associated computing display 108(1) and the computing device 102(N) may have an associated computing display 108(N). Each of the display devices 108 may have an associated imaging device, such as a camera, capable of capturing frames (e.g., images) at P frames per second (where P>0). Typical frame rates for videoconferencing may include 15 frames per second (fps), 30 fps, or 60 fps. Of course, depending on the implementation, other frame rates may be used. For example, as illustrated in FIG. 1, the display device 108(1) may have an associated camera 110(1) and the display device 108(N) may have an associated camera 110(N).

Each of the display devices 108 may display one or more windows in which frames of a video stream may be displayed. For example, each of the display devices 108 may display a window in which data (e.g., frames of a video stream) sent from another device is displayed. In some cases, at least some of the display devices 108 may display a window in which data (e.g., frames of a video stream) being sent from the associated computing device is displayed. For example, in a videoconferencing session with three participants, the display device 108(1) may display a window 112(1) in which data (e.g., frames of the video stream) being sent from the computing device 102(1) is displayed, a window 112(2) in which data being sent from a computing device 102(2) is displayed, and a window 112(N) in which data being sent from the computing device 102(N) is displayed. As another example, in a videoconferencing session with four participants, the display device 108(1) may display a window 112(1) in which data being sent from a computing device 102(1) is displayed, a window 112(2) in which data being sent from the computing device 102(2) is displayed, and a window 112(N) in which data being sent from the computing device 102(N) is displayed.

In some cases, the windows 112 may each be approximately the same size, while in other cases, two (or more) of the windows 112 may differ in size. As illustrated in FIG. 1, the window 112(N) may be larger than the remaining windows 112(1) and 112(2). For example, the audio portion of each video stream may be monitored (e.g., by the receiving device(s), the server 104, or both) to identify a video stream with the loudest corresponding audio stream among the multiple video streams, indicating that the participant in the video stream is speaking. The window in which the video stream with the loudest corresponding audio stream is being displayed may be enlarged. As illustrated in FIG. 1, the window 112(N) may be larger than the windows 112(1) and 112(2) because the participant depicted in the frames of the video stream displayed in the window 112(N) is currently speaking. When the participant depicted in the frames of the video stream displayed in the window 112(2) begins speaking, the window 112(2) may be enlarged and the window 112(N) may be shrunk.

The cameras 110 may capture a video stream (including an audio stream) that includes frames at a particular frame rate (e.g., 15 fps, 30, fps, 60 fps, or the like) and send each captured frame to the associated computing device 102. For example, the camera 110(1) may capture and send a frame 114(1) to the computing device 102(1). The camera 110(N) may capture and send a frame 114(N) to the computing device 102(N).

Each computing device 102 may include memory to store data, such as the frame 114 and a set of (one or more) portions 116. The memory of each computing device 102 may include software modules, such as a decomposer software module 118 to decompose the frame 114 into the set of portions 116, a matcher module 120 that determines whether each of the portions 116 matches a previously sent portion, and a re-constructer module 122 to reconstruct a frame using a set of portions received from another computing device. A decomposer software module may decompose the frame 114 into multiple portions, such as a portion that includes a left eye, a portion that includes a right eye, a portion that includes a forehead, a portion that includes a top of the head, a portion that includes a nose, a portion that includes a mouth, a portion that includes a chin, etc. For example, the decomposer module 118(1) may decompose the frame 114(1) into a set of portions 116(1). The decomposer module 118(N) may decompose the frame 114(N) into a set of portions 116(N). In some implementations, the decomposer module 118(1) may perform facial recognition on the frame 114(1) such that the portions 116(1) may include portions of a participant's face and may exclude portions that do not include facial features, such as background objects. For example, the decomposer module 118(1) may include a classifier (e.g., support vector machine or other machine learning algorithm) that is trained to identify facial features for decomposition into the portions 116(1).

The memory of each computing device may include a sent catalog 124 with information about portions (of frames) that have been sent and one or more received catalogs 126 with information about frames sent from other participating devices. For example, the sent catalog 124(1) may include sent portions 130(1) that include portions of frames sent from the computing device 102(1) to the server 104 for distribution to other participating devices. The sent catalog 124(1) may include identifiers 132(1), where each portion of the set of sent portions 130(1) has a corresponding identifier in the identifiers 132(1). The sent catalog 124(1) may include portion data 134(1) that includes data associated with each of the sent portions 130(1). For example, the portion data 134(1) may include a count identifying how frequently an identifier associated with each of the sent portions 130 is being sent. To illustrate, a group of portions that are frequently sent may be grouped into a macro. The identifiers 132(1) may include macro identifiers, where a macro identifier references two or more portions, e.g., the macro identifier may reference two or more identifiers that in turn reference (e.g., correspond to) the two or more portions.

Each received catalog 126 may include portions 136 of frames and corresponding identifiers 138 received (e.g., via the server 104) from other devices participating in the videoconferencing session. For example, the received catalog 126(1) may include the received portions 136(1) and the corresponding identifiers 138(1) received (e.g., via the server 104) from the computing device 102(1). The received catalog 126(2) may include the received portions 136(2) and the corresponding identifiers 138(2) received (e.g., via the server 104) from the computing device 102(2). The received catalog 126(N−1) may include the received portions 136(N−1) and the corresponding identifiers 138(N−1) received (e.g., via the server 104) from a computing device 102(N−1). The received catalog 126(N) may include the received portions 136(N) and the corresponding identifiers 138(N) received (e.g., via the server 104) from the computing device 102(N).

In some implementations, a single received catalog may include portions of frames and corresponding identifiers received from other participating devices. For example, a single received catalog at the computing device 102(1) may include the contents of the received catalogs 126(2) through 126(N) and a single received catalog at the computing device 102(N) may include the contents of the received catalogs 126(1) through 126(N−1).

In some cases, after the computing device 102(1) determines that all the portions 116(1) have been selected to determine if they have a matching portion in the sent portions 130(1), the computing device 102(1) may send a "frame complete" indicator to indicate to receiving devices that all the portions of the frame have been sent. For example, the receiving devices may reconstruct a frame after receiving the "frame complete" indicator.

The server 104 may be a multi-hosting server capable of managing multiple videoconferencing sessions substantially simultaneously (e.g., in parallel). For example, the server 104 may store conference data 104(1) associated with a first video conference and conference data 140(M) associated with an Mth video conference (e.g., where M>0). The conference data 140(M) may include information associated with each of the participating devices. For example, the conference data 140(M) may be associated with a videoconferencing session in which the computing devices 102(1) to 102(N) are participating. In this example, information 142(1) may be associated with the computing device 102(1) and information 142(N) may be associated with the computing device 102(N). The information 142(N) may include an internet protocol (IP) address associated with the computing device 102(N), an available bandwidth of a communication link between the server 104 and the computing device 102(N), a frame rate associated with video streams sent from the computing device 102(N), other information associated with the computing device 102(N) or any combination thereof.

The computing device 102(1) may receive the frame 114(1) from the camera 110(1). In some implementations, the computing device 102(1) instructs the display device 108(1) to display the frame 114(1) in a window, such as the window 112(1). The decomposer module 118(1) may decompose the frame 114(1) into a set of portions 116(1). The matcher module 120(1) may select a portion from the portions 116(1) and determine if the selected portion matches one of the sent portions 130(1) in the sent catalog. If the selected portion matches one of the sent portions 130(1) in the sent catalog, an identifier (from the identifiers 132(1)) associated with the matching portion (in the sent portions 130(1)) may be included in data 144 sent to the server 104. If the selected portion does not match any of the sent portions 130(1) in the sent catalog, a new identifier may be created for the selected portion, the new identifier may be associated with the selected portion, the new identifier and the selected portion may be included in data 144 sent to the server 104, and the new identifier and the selected portion may be stored in the sent catalog 124(1). For example, the new identifier may be stored in the identifiers 132(1) and the selected portion may be stored in the sent portions 130(1). The new identifier may be created using the selected portion as input to a hashing function (or other type of fingerprinting function) to generate a numerical representation of the selected portion that can be used when determining whether the selected portion matches one of the sent portions 130(1). In some cases, the computing device 102(1) may keep track of how often each of the identifiers 132(1) are sent using the portion data 134(1) and create a macro for a set of frequently sent identifiers that are associated with a particular frame. For example, if a set of identifiers are frequently sent together to reconstruct a frame, the set of identifiers may be grouped together as a macro.

The server 104 may receive the data 144 from the computing device 102(1), determine addresses of devices participating in the video conference (e.g., based on the conference data 140(M)), and distribute the data 144 to the other devices, e.g., the devices 102(2) to 102(N). The data 144 may be part of a video stream that includes audio data. The data 144 may include information indicating that the data 144 was sent from the computing device 102(1) and the server 104 may include the originating device information when distributing the data 144 to participating devices.

Each of the devices participating in the video conference may receive the data 144 and process the data 144 to reconstruct the frame 114(1). For example, the computing device 102(N) may receive the data 144 and determine whether the data 144 includes (i) a portion of an image and a corresponding identifier, (ii) an identifier, or (iii) (in some cases) a frame complete indicator. The frame complete indicator may cause a receiving device to reconstruct a frame based on received portions in a received catalog. For example, a user selectable option may enable a user to specify whether to display partial frames (e.g., display portions of a frame as they are received) or to display complete frames. If the user selects the option to display partial frames, a receiving device may display portions of a frame as they are received. If the user selects the option to display complete frames, a receiving device may receive and store portions of a frame and then reconstruct the frame after receiving the frame complete indicator. If the data 144 includes a portion of an image and a corresponding identifier, the computing device 102(N) may add, to the received catalog 126(1), the portion from the data 144 to the received portions 136(1) and the identifier from the data 144 to the identifiers 138(1). If the data 144 includes an identifier, the computing device 102(N) may identify the identifier in the identifiers 138(1) in the received catalog 126(1) and retrieve the corresponding portion from the received portions 136(1).

Each participant may select an option whether to view partial frames or view complete frames during the video-conferencing session. If a participant associated with the computing device 102(N) selects to view partial frames, the portion included in the data 144 or the portion retrieved from the received portions 136(1) of the received catalog 126(1) may be sent to the display device 108(N) for display in a window, e.g., the window 112(1). If a participant associated with the computing device 102(N) selects to view complete frames, the computing device 102(N) may reconstruct the frame 114(1) in the window 112(1) in response to determining that the data 144 includes the frame complete indicator.

The re-constructer 122(N) may re-construct a frame for display in one of the windows 112(1), 112(2), to 112(N) based on the received catalogs 126(1) to 126(N−1). For example, the re-constructer 122(N) may re-construct the frame 114(1) based on the received portions 126(1) sent from the computing device 102(1). In some cases, the server 104 may determine an available bandwidth of communication links between the server 104 and each of the computing devices 102(1) to 102(N) and selectively re-transmit sent portions. For example, if the server 104 determines that the communication link between the server 104 and the computing device 102(N) has a relatively low available bandwidth, the server 104 may re-transmit those of the sent portions 130(1) that include a mouth of the participant (or the mouth and the eyes of the participant) while not re-transmitting other sent portions 130(1). In this way, some portions that include certain facial features (e.g., mouth, eyes, etc.) that include more movement may be re-transmitted, while portions that include other facial features (e.g., nose, chin, forehead, top of the head, hair, etc.) with little (or no) movement may not be re-transmitted to reduce bandwidth usage.

Thus, for each frame in a video stream, the frame may be decomposed into multiple portions. Each portion may be selected and a determination may be made whether the portion matches a previously sent portion. If the portion does not match a previously sent portion, an identifier may be created and associated with the portion, the portion and the identifier may be stored in a sent catalog, and the portion and the identifier may be sent to a server for distribution to other devices participating in a video conference. If the portion matches a previously sent portion, an identifier associated with the previously sent portion may be sent (e.g., instead of sending the portion itself), thereby reducing a bandwidth used by the video stream.

In some implementations, two or more of the various operations described herein may be performed substantially in parallel (e.g., in a multi-threaded environment). For example, the matcher module 120(1) may select each of the portions 116(1) and determine whether each of the selected portions matches one of the sent portions 130(1) substantially in parallel with the decomposer module 118(1) decomposing a subsequent frame (e.g., subsequent to the frame 114(1)) into portions. Two or more instances of the re-constructer module 122(1) may execute substantially in parallel to reconstruct frames from the received catalogs 126(2) to 126(N). In addition, the instances of the re-constructer module 122(1) may execute substantially in parallel with the matcher module 120(1) and the decomposer module 118(1).

A receiving device may receive data related to the video conference in which the receiving device is participating. If the data includes a portion of an image and an identifier, the portion and the identifier may be stored in a received catalog associated with the sending device. If a partial frame option has been selected, the portion may be sent to a display device for display in a window. If a complete frame option has been selected, the portion may remain in the received catalog until the receiving device receives a "frame complete" indicator. If the data includes an identifier, the identifier may be used to retrieve a previously sent portion that is stored in the received catalog associated with the sending device. If a partial frame option has been selected, the retrieved portion may be sent to a display device for display in a window. If a complete frame option has been selected, the portion may remain in the received catalog until the receiving device receives a "frame complete" indicator. In this way, bandwidth usage for videoconferencing may be significantly reduced.

Figure 2:
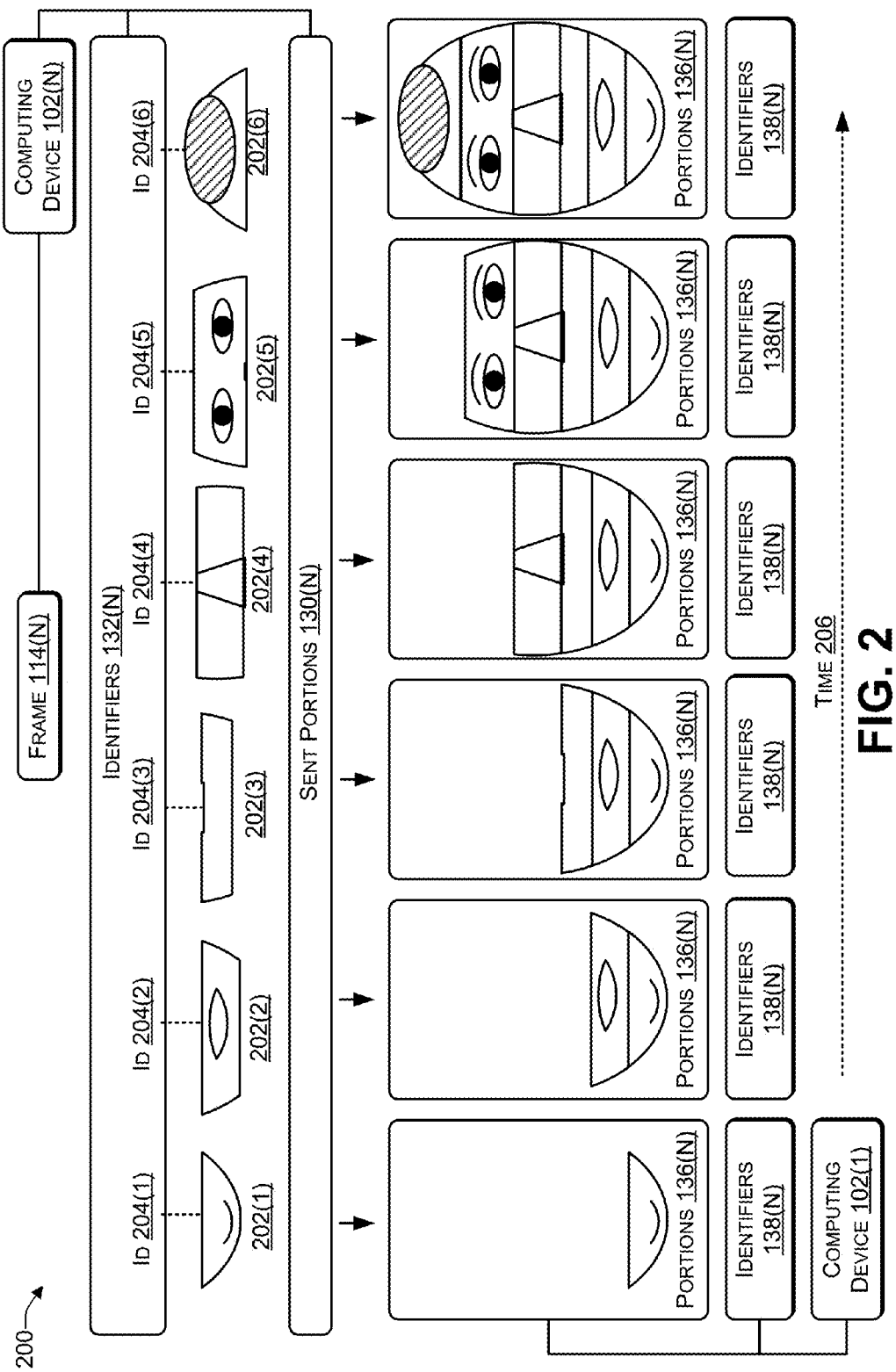
FIG. 2 is a block diagram illustrating a received catalog receiving a frame according to some embodiments.

FIG. 2 is a block diagram 200 illustrating a received catalog receiving a frame according to some embodiments.

In FIG. 1, the computing device 102(N) may receive the frame 114(N) from the camera 110(N). The decomposer module 118(N) may decompose the frame 114(N) into the portions 116(N). The matcher module 120(N) may select each of the portions 116(N) and determine whether the set of sent portions 130(N) includes a matching portion.

Initially, the set of sent portions 130(N) may include zero portions. Therefore, after the frame 114(N) has been decomposed, the matcher may select a particular portion of the portions 116(N), determine that the particular portion does not have a match in the sent portions 130(N), generate an identifier for the particular portion, associate the identifier with the particular portion, and send the identifier with the particular portion to a videoconferencing server (e.g., the server 104) for distribution to other devices participating in the video conference. For example, as illustrated in FIG. 2, the frame 114(N) may be decomposed into a portion 202(1) (e.g., that includes the chin), a portion 202(2) (e.g., that includes the mount), a portion 202(3) (e.g., that includes a portion below the nose and above the upper lip), a portion 202(4) (e.g., that includes the nose), a portion 202(5) (e.g., that includes the eyes), and a portion 202(6) (e.g., that includes the top of the head).

An identifier (abbreviated "Id" in FIG. 2) may be associated with each portion that does not match a previous one of the portions 136(N). The identifier and the portion may be sent to the videoconferencing server for distribution to participating devices. For example, the matcher 120(N) may determine that the portion 202(1) does not match any of portions in the sent portions 130(N), create an identifier (abbreviated "Id." in FIG. 2) 204(1), associate the identifier 204(1) with the portion 202(1), send the portion 202(1) and the identifier 204(1) to the videoconferencing server (e.g., the server 104 of FIG. 1), store the portion 202(1) in the sent portions 130(N), and store the associated identifier 204(1) in the identifiers 132(N). In some cases, the identifier 204(1) may be created using a hashing (e.g., fingerprinting) function that uses the portion 202(1) as input. The videoconferencing server may receive a portion and an associated identifier, identify the devices participating in the video conference, and distribute the portion and the associated identifier to the other participating devices. For example, the server 104 may receive the portion 202(1) and the identifier 204(1) from the computing device 102(N), determine the participating devices (e.g., devices 102(1) to 102(N−1)), and distribute the portion 202(1) and the identifier 204(1) to the participating devices. Each of the participating devices may receive the portion and the associated identifier and store the portion and the associated identifier in a received catalog associated with the device that sent the portion and the identifier. For example, the computing device 102(1) may receive the portion 202(1) and the identifier 204(1) from the server 104, store the portion 202(1) in the received portions 136(N), and store the identifier 204(1) in the identifiers 138(N). In some cases, if the option to display partial frames is enabled, the computing device 102(1) may send the portion 202(1) to a display device. The matcher 120(N) may determine that the portion 202(2) does not match any of the portions in the sent portions 130(N), create an identifier 204(2), associate the identifier 204(2) with the portion 202(2), send the portion 202(2) and the identifier 204(2) to the videoconferencing server, store the portion 202(2) in the sent portions 130(N), and store the associated identifier 204(2) in the identifiers 132(N). The server 104 may receive the portion 202(2) and the identifier 204(2) from the computing device 102(N), determine the participating devices (e.g., devices 102(1) to 102(N−1)), and distribute the portion 202(2) and the identifier 204(2) to the participating devices. The computing device 102(1) may receive the portion 202(2) and the identifier 204(2) from the server 104, store the portion 202(2) in the received portions 136(N), and store the identifier 204(2) in the identifiers 138(N). Similarly, an identifier 204(3) may be associated with the portion 202(3), both may be sent to the server, both may be received by participating devices including the computing device 102(1), and stored in the identifiers 138(N) and the portions 136(N), respectively. An identifier 204(4) may be associated with the portion 202(4), both may be sent to the server, both may be received by participating devices including the computing device 102(1), and stored in the identifiers 138(N) and the portions 136(N), respectively. An identifier 204(5) may be associated with the portion 202(5), both may be sent to the server, both may be received by participating devices including the computing device 102(1), and stored in the identifiers 138(N) and the portions 136(N), respectively. An identifier 204(6) may be associated with the portion 202(6), both may be sent to the server, both may be received by participating devices including the computing device 102(1), and stored in the identifiers 138(N) and the portions 136(N), respectively.

At each of the participating devices, such as the computing device 102(1), as an amount of time 206 increases, the portions 136(N) may increase. After the portions of the frame 114(N) have been stored in the portions 136(N), large portions of subsequent frames may match the sent portions 130(N), resulting in fewer portions being sent, as illustrated in FIG. 3.

Figure 3:
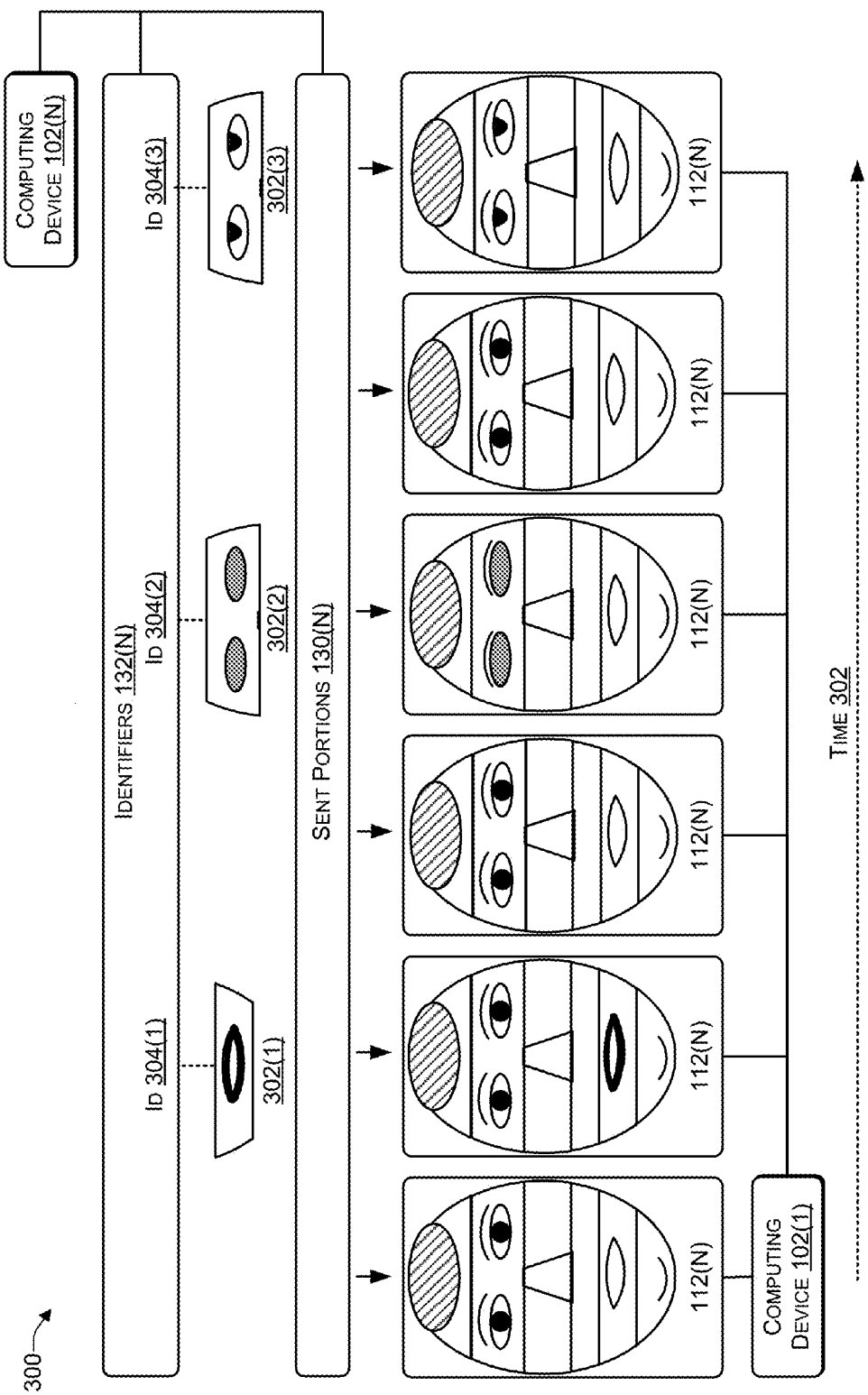
FIG. 3 is a block diagram illustrating a received catalog receiving subsequent frames according to some embodiments.

FIG. 3 is a block diagram 300 illustrating a received catalog receiving subsequent frames according to some embodiments. For example, in a first subsequent frame (e.g., subsequent to the frame 114(N)), a participant may purse their lips. A determination may be made that a portion 302(1) including the pursed lips is not included in the sent portions 130(N) and an identifier 304(1) may be created and associated with the portion 302(1). To enable participating devices to display the subsequent frame, the computing device 102(N) may send the identifiers 202(1), 202(3), 202(4), 202(5), 202(6) along with the portion 302(1) and the identifier 304(1) to the server 104 for distribution to participating devices. Thus, in this example, the portion 302(1) is substituted for the portion 202(2) while the remaining portions of the frame do not change. The identifier 304(1) may be added to the identifiers 132(N) and the portion 302(1) may be added to the sent portions 130(N).

In a second subsequent frame (e.g., subsequent to the frame 114(N)), a participant may blink, resulting in the frame including a participant with his or her eyes closed. A determination may be made that a portion 302(2) including the eyes closed is not included in the sent portions 130(N) and an identifier 304(2) may be created and associated with the portion 302(2). To enable participating devices to display the subsequent frame, the computing device 102(N) may send the identifiers 202(1), 202(2), 202(3), 202(4), 202(5), 202(6) along with the portion 302(2) and the identifier 304(2) to the server 104 for distribution to participating devices. In this example, the portion 302(2) is substituted for the portion 202(5) while the remaining portions of the frame do not change. The identifier 304(2) may be added to the identifiers 132(N) and the portion 302(2) may be added to the sent portions 130(N).

In a third subsequent frame (e.g., subsequent to the frame 114(N)), a participant may roll their eyes, resulting in the frame including eyes rolled upwards. A determination may be made that a portion 302(3) including the eyes rolled upwards is not included in the sent portions 130(N) and an identifier 304(3) may be created and associated with the portion 302(3). To enable participating devices to display the subsequent frame, the computing device 102(N) may send the identifiers 202(1), 202(2), 202(3), 202(4), 202(5), 202(6) along with the portion 302(3) and the identifier 304(3) to the server 104 for distribution to participating devices. In this example, the portion 302(3) is substituted for the portion 202(5) while the remaining portions of the frame do not change. The identifier 304(3) may be added to the identifiers 132(N) and the portion 302(3) may be added to the sent portions 130(N).

When a subsequent frame can be reconstructed using previously sent portions of one or more frames, a sending device may send a set of identifiers (or a macro identifier) that reference previously sent portions. If the subsequent frame differs from previously sent portions by one or more portions, the one or more portions may be sent to a videoconferencing server, along with identifiers (or a macro identifier) that reference previously sent portions, to enable participating devices to reconstruct the subsequent frame. For example, a portion that includes the eyes of a participant, a portion that includes the lips of a participant, or both may be sent along with identifiers referencing other portions of the participant's face. In this way, bandwidth usage (and latency) may be significantly reduced as compared to sending multiple frames.

In the flow diagrams of FIGS. 4, 5, 6, and 7, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 400, 500, 600, and 700 are described with reference to FIGS. 1, 2, and 3 as described above, although other models, frameworks, systems and environments may implement these processes.

Figure 4:
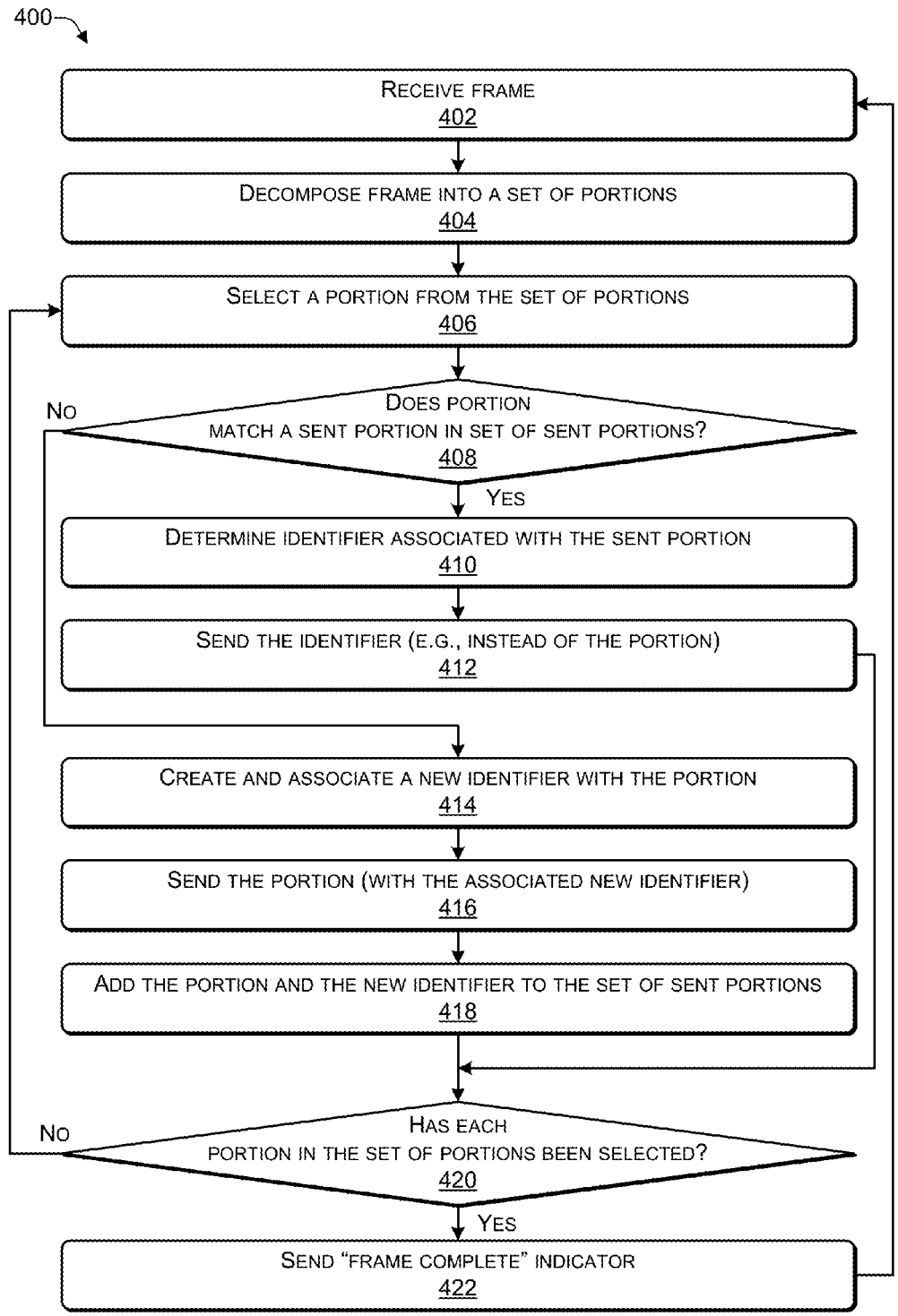
FIG. 4 is a flowchart of a process that includes decomposing a frame into a set of portions according to some embodiments.

FIG. 4 is a flowchart of a process 400 that includes decomposing a frame into a set of portions according to some embodiments. The process 400 may be performed by individual ones of the computing devices 102(1) to 102(N) of FIG. 1, 2, or 3. For example, the process 400 may be performed when a computing device 102 sends data including (i) an identifier or (ii) a portion and an associated identifier.

At 402, a frame may be received. At 404, the frame may be decomposed into a set of portions. For example, in FIG. 1, the camera 110(1) may capture and send the frame 114(1) to the computing device 102(1). The decomposer module 118(1) may decompose the frame 114(1) into the set of portions 116(1).

At 406, a portion may be selected. At 408, a determination may be made whether the portion matches a sent portion in a set of sent portions. In response to determining at 408, that (e.g., "yes") the portion matches a sent portion in the set of sent portions, an identifier associated with the sent portion may be determined, at 410, the identifier may be sent to a server, at 412, and the process may proceed to 420. In response to determining at 408, that (e.g., "no") the portion matches none of the sent portions, a new identifier may be created and associated with the portion, at 414, the portion and the associated new identifier may be sent to a server, at 416, and the portion and the new identifier may be added to the set of sent portions, at 418. For example, in FIG. 1, the matcher module 120(1) may select a portion from the portions 116(1) and determine if the selected portion matches one of the sent portions 130(1) in the sent catalog. If the selected portion matches one of the sent portions 130(1) in the sent catalog, an identifier (from the identifiers 132(1)) associated with the matching portion (in the sent portions 130(1)) may be included in data 144 sent to the server 104. If the selected portion does not match any of the sent portions 130(1) in the sent catalog, a new identifier may be created for the selected portion, the new identifier may be associated with the selected portion, the new identifier and the selected portion may be included in data 144 sent to the server 104, and the new identifier and the selected portion may be stored in the sent catalog 124(1). For example, the new identifier may be stored in the identifiers 132(1) and the selected portion may be stored in the sent portions 130(1). The new identifier may be created using the selected portion as input to a hashing function (or other type of indexing function) to generate a numerical representation of the selected portion that can be used when determining whether the selected portion matches one of the sent portions 130(1).

At 420, a determination may be made whether each portion in the set of portions have been selected. In response to determining, at 420, that (e.g., "yes") each portion in the set of portions has been selected, a "frame complete" indicator may be sent, at 422, and the process may proceed to 402, where the process may receive a next frame. In response to determining, at 420, that (e.g., "no") each portion in the set of portions has not been selected, the process may proceed to 406, and the process may select a next portion from the set of portions. For example, in FIG. 1, if the matcher module 120(1) determines that all the portions 116(1) have been selected, the computing device 102(1) may send a "frame complete" indicator to indicate to receiving devices that all the portions of the frame have been sent. If the matcher module 120(1) determines that not all of the portions 116(1) have been selected, the matcher module 120(1) may select another portion of the portions 116(1) (e.g., a portion that was not previously selected).

Thus, a computing device may receive a stream of video frames from a camera and may decompose each frame into a set of portions. A determination may be made whether each portion matches a previously sent portion. If a portion matches a previously sent portion, an identifier associated with the portion is sent to a videoconferencing server for distribution to other devices participating in the video conference. If the portion does not match any of the previously sent portions, an identifier may be created (e.g., a hash of the portion of the frame), the identifier may be associated with the portion, and the portion and the identifier may be sent to the videoconferencing server for distribution to other devices participating in the video conference. Thus, a catalog of sent portions may be used to store previously sent portions and corresponding identifiers. Over time, a participating device may send more identifiers and fewer portions, resulting in lower bandwidth usage and lower latency as compared to conventional videoconferencing systems in which multiple frames are transmitted.

Figure 5:
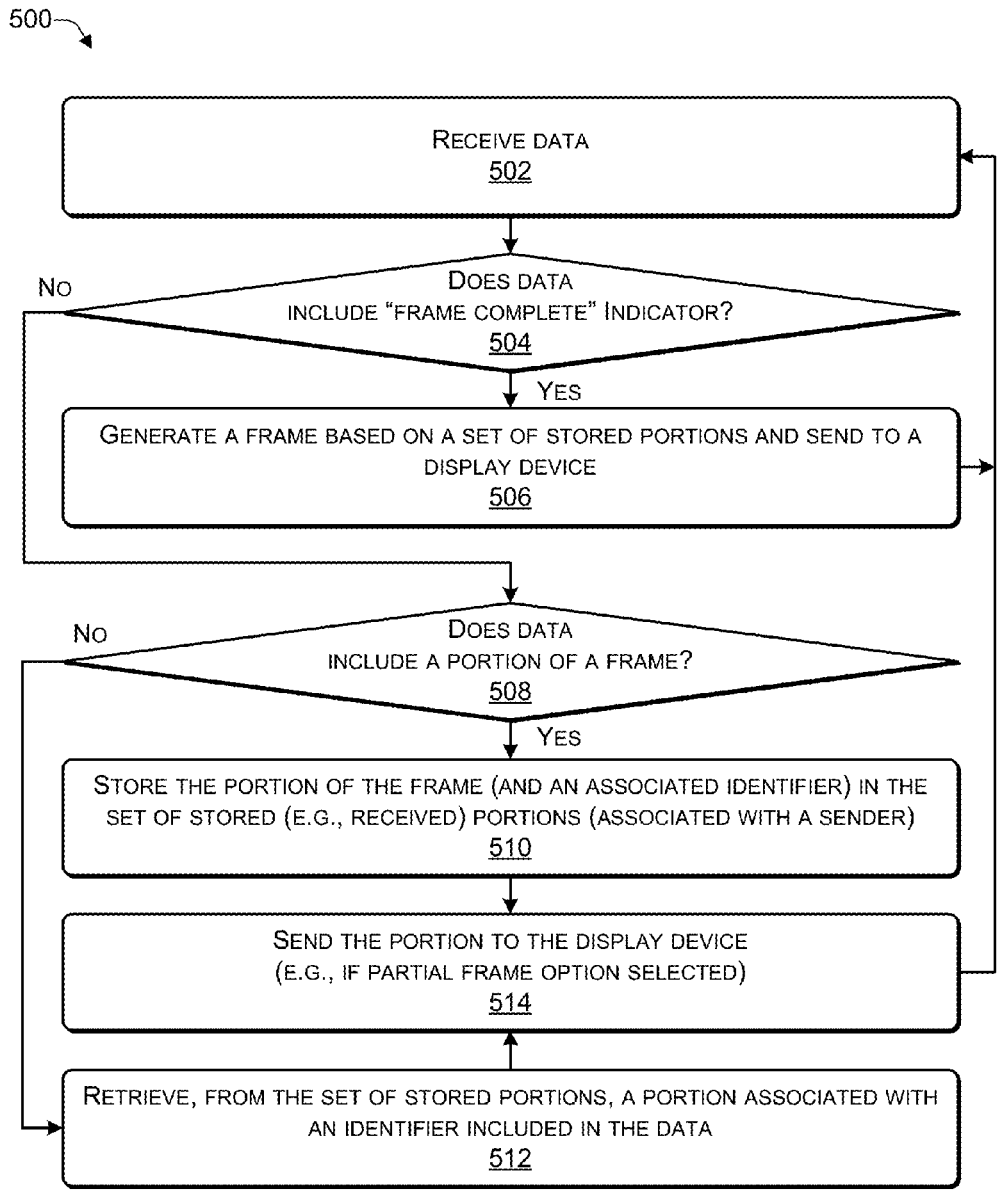
FIG. 5 is a flowchart of a process that includes generating a frame based on a set of stored portions according to some embodiments.

FIG. 5 is a flowchart of a process 500 that includes generating a frame based on a set of stored portions according to some embodiments. The process 500 may be performed by individual ones of the computing devices 102(1) to 102(N) of FIG. 1, 2, or 3. For example, the process 500 may be performed when a computing device 102 receives data including (i) an identifier or (ii) a portion and an associated identifier.

At 502, data may be received. At 504, a determination may be made whether the data includes a "frame complete" indicator. In response to determining, at 504, that ("yes") the data includes the "frame complete" indicator, a frame may be generated at 506 based on a set of stored portions and sent to a display device (e.g., for display in a window). In response to determining, at 504, that ("no") the data does not include the "frame complete" indicator, a determination may be made whether the data includes a portion of a frame.

In response to determining at 508, that ("yes") the data includes a portion of a frame, the portion of the frame and an associated identifier (e.g., included in the data) may be stored in the received catalog (e.g., associated with a sender), at 510. If a partial frame option has been selected, the stored portion may be sent to the display device, at 514, and the process may proceed to 502 to receive next data. If a complete frame option has been selected, the process may skip 514 and proceed to 502 to receive next data. In response to determining at 508, that ("no") the data does not includes a portion of a frame, an identifier included in the data may be used to retrieve an associated stored portion from a received catalog (e.g., associated with a sender), at 512. If a partial frame option has been selected, the stored portion may be sent to the display device, at 514, and the process may proceed to 502 to receive next data. If a complete frame option has been selected, the process may skip 514 and proceed to 502 to receive next data.

For example, in FIG. 1, the computing device 102(N) may receive the data 144 and determine whether the data 144 includes (i) a portion of an image and a corresponding identifier, (ii) an identifier, or (iii) a frame complete indicator. If the data 144 includes a portion of an image and a corresponding identifier, the computing device 102(N) may add, to the received catalog 126(1), the portion from the data 144 to the received portions 136(1) and the identifier from the data 144 to the identifiers 138(1). If the data 144 includes an identifier, the computing device 102(N) may identify the identifier in the identifiers 138(1) in the received catalog 126(1) and retrieve the corresponding portion from the received portions 136(1). If a participant associated with the computing device 102(N) selects to view partial frames, the portion included in the data 144 or the portion retrieved from the received portions 136(1) of the received catalog 126(1) may be sent to the display device 108(N) for display in a window, e.g., the window 112(1). If a participant associated with the computing device 102(N) selects to view complete frames, computing device 102(N) may reconstruct the frame 114(1) in the window 112(1) in response to determining that the data 144 includes the frame complete indicator.

Thus, data may be received from a videoconferencing server. If the data includes a portion of a frame and an associated identifier, the portion and the identifier are stored in a received catalog associated with the sending device. If the data includes an identifier, a previously sent portion may be retrieved from the received catalog based on the identifier. The stored portion may be displayed if partial frames are selected. If the data includes a "frame complete" indicator, a frame may be created based on the received catalog and sent to a display device.

Figure 6:
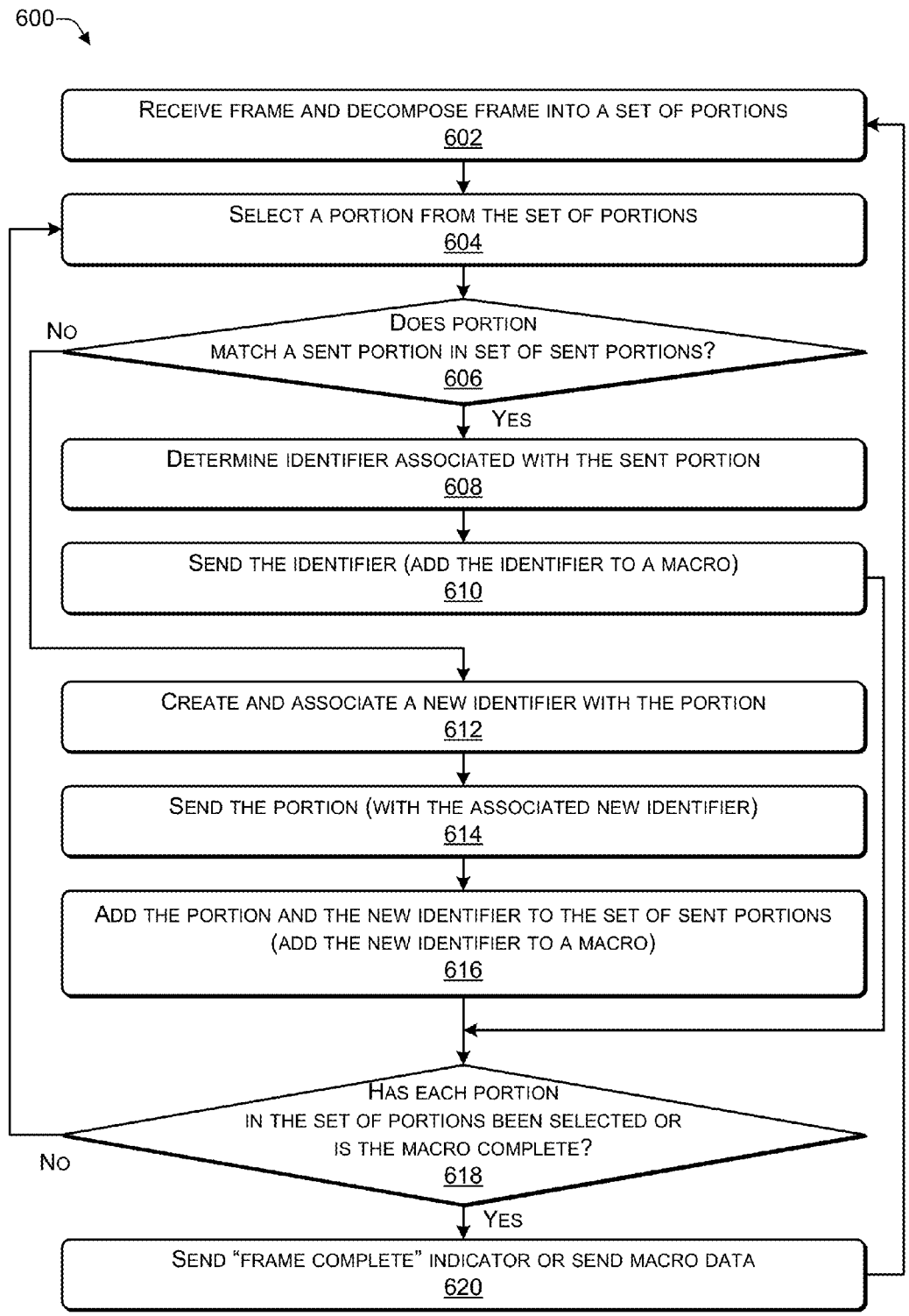
FIG. 6 is a flowchart of a process that includes sending macro data according to some embodiments.

FIG. 6 is a flowchart of a process 600 that includes sending macro data according to some embodiments. The process 600 may be performed by individual ones of the computing devices 102(1) to 102(N) of FIG. 1, 2, or 3. For example, the process 600 may be performed when a computing device 102 sends data including (i) an identifier associated with a portion, (ii) a macro identifier, or (iii) a portion and an associated identifier.

At 602, a frame may be received and decomposed into a set of portions. For example, in FIG. 1, the camera 110(1) may capture and send the frame 114(1) to the computing device 102(1). The decomposer module 118(1) may decompose the frame 114(1) into the set of portions 116(1).

At 604, a portion may be selected. At 606, a determination may be made whether the portion matches a sent portion in a set of sent portions. In response to determining at 606, that (e.g., "yes") the portion matches a sent portion in the set of sent portions, an identifier associated with the sent portion may be determined, at 608, the identifier may be sent to a server (and in some cases, the identifier may be added to a macro), at 610, and the process may proceed to 618. In response to determining at 606, that (e.g., "no") the portion matches none of the sent portions, a new identifier may be created and associated with the portion, at 612, the portion and the associated new identifier may be sent to a server, at 614, and the portion and the new identifier may be added to the set of sent portions, at 616. For example, in FIG. 1, the matcher module 120(1) may select a portion from the portions 116(1) and determine if the selected portion matches one of the sent portions 130(1) in the sent catalog. If the selected portion matches one of the sent portions 130(1) in the sent catalog, an identifier (from the identifiers 132(1)) associated with the matching portion (in the sent portions 130(1)) may be included in data 144 sent to the server 104. If the selected portion does not match any of the sent portions 130(1) in the sent catalog, a new identifier may be created for the selected portion, the new identifier may be associated with the selected portion, the new identifier and the selected portion may be included in data 144 sent to the server 104, and the new identifier and the selected portion may be stored in the sent catalog 124(1). For example, the new identifier may be stored in the identifiers 132(1) and the selected portion may be stored in the sent portions 130(1). The new identifier may be created using the selected portion as input to a hashing function (or other type of indexing function) to generate a numerical representation of the selected portion that can be used when determining whether the selected portion matches one of the sent portions 130(1).

At 618, a determination may be made whether each portion in the set of portions have been selected or whether a macro has been completed. In response to determining, at 618, that (e.g., "yes") each portion in the set of portions has been selected or the macro is complete, a "frame complete" indicator or macro data (e.g., a macro identifier and the portions that the macro identifier references) may be sent, at 620, and the process may proceed to 602, where the process may receive a next frame and decompose the next frame into a next set of portion. In response to determining, at 620, that (e.g., "no") each portion in the set of portions has not been selected or the macro has not been completed, the process may proceed to 604, and the process may select a next portion from the set of portions. For example, in FIG. 1, if the matcher module 120(1) determines that all the portions 116(1) have been selected or a macro is complete, the computing device 102(1) may send a "frame complete" indicator or macro data. If the matcher module 120(1) determines that not all of the portions 116(1) have been selected, the matcher module 120(1) may select another portion of the portions 116(1) (e.g., a portion that was not previously selected).

Thus, a computing device may receive a stream of video frames from a camera and may decompose each frame into a set of portions. A determination may be made whether each portion matches a previously sent portion. If a portion matches a previously sent portion, an identifier associated with the portion may be added to a macro and may be sent to a videoconferencing server for distribution to other devices participating in the video conference. If the portion does not match any of the previously sent portions, an identifier may be created (e.g., a hash of the portion of the frame), the identifier may be associated with the portion, and the portion and the identifier may be added to a macro and sent to the videoconferencing server for distribution to other devices participating in the video conference. Thus, a catalog of sent portions may be used to store previously sent portions and corresponding identifiers. Over time, a participating device may send more identifiers and fewer portions, resulting in lower bandwidth usage and lower latency as compared to conventional videoconferencing systems in which multiple frames are transmitted. In some cases, a macro that includes a set of frequently referenced portions (e.g., frequently sent identifiers) may be created and sent. The macro data may include a macro identifier that references multiple previously sent portions. For example, the macro data may include multiple identifiers associated with multiple previously sent portions.

Figure 7:
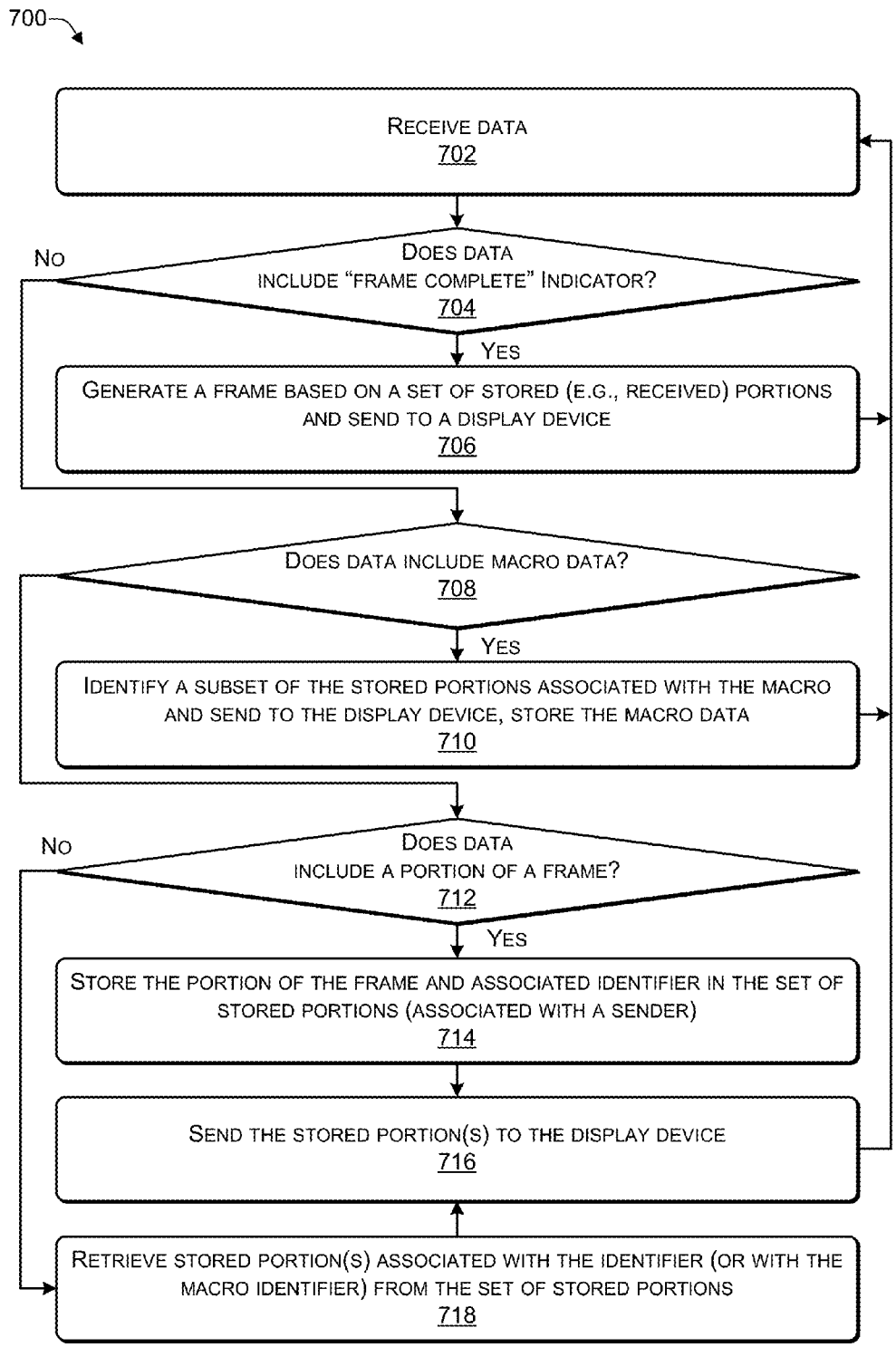
FIG. 7 is a flowchart of a process that includes receiving data according to some embodiments.

FIG. 7 is a flowchart of a process 700 that includes receiving data according to some embodiments. The process 700 may be performed by individual ones of the computing devices 102(1) to 102(N) of FIG. 1, 2, or 3. For example, the process 400 may be performed when a computing device 102 receives data including (i) an identifier associated with a portion, (ii) a macro identifier, or (iii) a portion and an associated identifier.

At 702, data may be received. At 704, a determination may be made whether the data includes a "frame complete" indicator. In response to determining, at 704, that ("yes") the data includes the "frame complete" indicator, a frame may be generated at 706 based on a set of stored portions (e.g., in a received catalog) and sent to a display device (e.g., for display in a window). In response to determining, at 704, that ("no") the data does not include the "frame complete" indicator, a determination may be made whether the data includes macro data, at 708. In response to determining, at 708, that ("yes") the data includes macro data, at 710 the macro data may be stored, a subset of the stored portions (e.g., in the received catalog) that are associated with the macro may be identified and sent to a display device, and the process may proceed to 702 to receive next data. In some cases, the macro may reference portions that may be used to reconstruct a frame. In response to determining, at 708, that ("no") the data does not include macro data, the process may proceed to 712.

At 712, a determination may be made whether the data includes a portion of a frame. In response to determining at 712, that ("yes") the data includes a portion of a frame, the portion of the frame and an associated identifier (e.g., included in the data) may be stored in the received catalog (e.g., associated with a sender), at 714. If a partial frame option has been selected, the stored portion may be sent to the display device, at 716, and the process may proceed to 702 to receive next data. If a complete frame option has been selected, the process may skip 716 and proceed to 702 to receive next data. In response to determining at 712, that ("no") the data does not includes a portion of a frame, an identifier (e.g., a portion identifier or a macro identifier) included in the data may be used to retrieve one or more associated stored portion(s) from a received catalog (e.g., associated with a sender), at 718. If a partial frame option has been selected, the stored portion may be sent to the display device, at 716, and the process may proceed to 702 to receive next data. If a complete frame option has been selected, the process may skip 716 and proceed to 702 to receive next data.

For example, in FIG. 1, the computing device 102(N) may receive the data 144 and determine whether the data 144 includes (i) a portion of an image and a corresponding identifier, (ii) an identifier (e.g., a portion identifier or a macro identifier), (iii) a frame complete indicator, or (iv) macro data. If the data 144 includes a portion of an image and a corresponding identifier, the computing device 102(N) may add, to the received catalog 126(1), the portion from the data 144 to the received portions 136(1) and the identifier from the data 144 to the identifiers 138(1). If the data 144 includes an identifier (e.g., a portion identifier or a macro identifier), the computing device 102(N) may retrieve the corresponding portion(s) from the received portions 136(1). If the data 144 includes macro data, the macro data may be stored, and the portion(s) referenced by the macro may be retrieved from the received portions 136(1). If a participant associated with the computing device 102(N) selects to view partial frames, the portion included in the data 144 or the portion(s) retrieved from the received portions 136(1) of the received catalog 126(1) may be sent to the display device 108(N) for display in a window, e.g., the window 112(1). If a participant associated with the computing device 102(N) selects to view complete frames, computing device 102(N) may reconstruct the frame 114(1) in the window 112(1) in response to determining that the data 144 includes the frame complete indicator.

Thus, data may be received from a videoconferencing server. If the data includes a portion of a frame and an associated identifier, the portion and the identifier are stored in a received catalog associated with the sending device. If the data includes an identifier, a previously sent portion may be retrieved from the received catalog based on the identifier. The stored portion may be displayed if partial frames are selected. If the data includes a "frame complete" indicator, a frame may be created based on the received catalog and sent to a display device.

Figure 8:
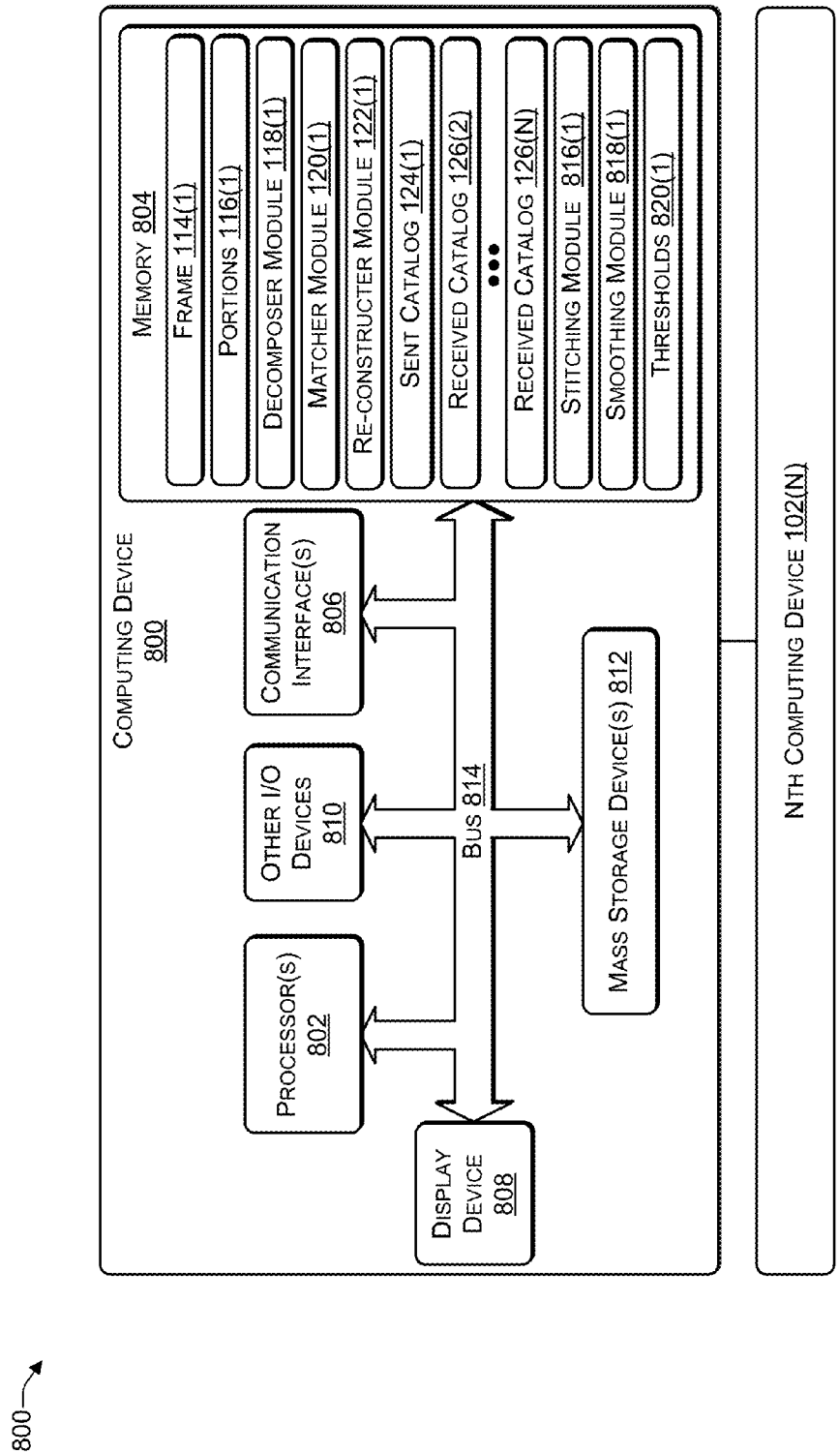
FIG. 8 illustrates an example configuration of a computing device that can be used to implement the systems and techniques described herein.

FIG. 8 illustrates an example configuration of a computing device 800 that can be used to implement the systems and techniques described herein, such as to implement the computing devices 102(1) to 102(N) of FIGS. 1, 2, and 3 or the server 104 of FIG. 1. The computing device 800 may include one or more processors 802, a memory 804, communication interfaces 806, a display device 808, other input/output (I/O) devices 810, and one or more mass storage devices 812, configured to communicate with each other, such as via a system bus 814 or other suitable connection.

The processor 802 is a hardware device (e.g., an integrated circuit) that may include a single processing unit or a number of processing units, all or some of which may include single or multiple computing units or multiple cores. The processor 802 can be implemented as one or more microprocessors, microcomputers, microcontrollers, digital signal processors, central processing units, state machines, logic circuitries, and/or any devices that manipulate signals based on operational instructions. Among other capabilities, the processor 802 can be configured to fetch and execute computer-readable instructions stored in the memory 804, mass storage devices 812, or other computer-readable media.

Memory 804 and mass storage devices 812 are examples of computer storage media (e.g., memory storage devices)

for storing instructions which are executed by the processor 802 to perform the various functions described above. For example, memory 804 may generally include both volatile memory and non-volatile memory (e.g., RAM, ROM, or the like) devices. Further, mass storage devices 812 may include hard disk drives, solid-state drives, removable media, including external and removable drives, memory cards, flash memory, floppy disks, optical disks (e.g., CD, DVD), a storage array, a network attached storage, a storage area network, or the like. Both memory 804 and mass storage devices 812 may be collectively referred to as memory or computer storage media herein, and may be a media capable of storing computer-readable, processor-executable program instructions as computer program code that can be executed by the processor 802 as a particular machine configured for carrying out the operations and functions described in the implementations herein.

The computing device 800 may also include one or more communication interfaces 806 for exchanging data via the network 106 with network elements 816. The communication interfaces 806 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, cellular, satellite, etc.), the Internet and the like. Communication interfaces 806 can also provide communication with external storage (not shown), such as in a storage array, network attached storage, storage area network, or the like.

A display device 808, such as a monitor may be included in some implementations for displaying information and images to users. Other I/O devices 810 may be devices that receive various inputs from a user and provide various outputs to the user, and may include a keyboard, a remote controller, a mouse, a printer, audio input/output devices, and so forth.

The computer storage media, such as memory 804 and mass storage devices 812, may be used to store software and data. For example, the computer storage media may be used to store software programs, such as the decomposer module 118(1), the matcher module 120(1), the re-constructer module 122(1), a stitching module 816(1), and a smoothing module 818(1). The stitching module 816(1) may implement an image stitching algorithm to combine multiple portions of frames (e.g., images) to re-construct a frame. The smoothing module 818(1) may blend portions together and to reduce the visibility of seams between portions. Because a re-constructed frame may use portions from more than one frame, the smoothing module 818(1) may adjust a white balance of one or more portions being used to re-construct a frame, adjust colors of one or more portions being used to re-construct a frame, make another type of adjustment of one or more portions, or any combination thereof. The computer storage media may be used to store data, such as the frame 114(1), the portions 116(1), the sent catalog 124(1), the received catalogs 126(2) to 126(N), and one or more thresholds 820(1). For example, the thresholds 820(1) may include a threshold used to determine whether each of the portions 116(1) matches a sent portion in the sent catalog 124(1). For example, a particular portion of the portions 116(1) may match a sent portion in the sent catalog 124(1) when the particular portion differs from the sent portion by less than a threshold.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement pre-scribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, and can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Software modules include one or more of applications, bytecode, computer programs, executable files, computer-executable instructions, program modules, code expressed as source code in a high-level programming language such as C, C++, Perl, or other, a low-level programming code such as machine code, etc. An example software module is a basic input/output system (BIOS) file. A software module may include an application programming interface (API), a dynamic-link library (DLL) file, an executable (e.g., .exe) file, firmware, and so forth.

Processes described herein may be illustrated as a collection of blocks in a logical flow graph, which represent a sequence of operations that can be implemented in hardware, software, or a combination thereof. In the context of software, the blocks represent computer-executable instructions that are executable by one or more processors to perform the recited operations. The order in which the operations are described or depicted in the flow graph is not intended to be construed as a limitation. Also, one or more of the described blocks may be omitted without departing from the scope of the present disclosure.

Although various embodiments of the method and apparatus of the present disclosure have been illustrated herein in the Drawings and described in the Detailed Description, it will be understood that the disclosure is not limited to the embodiments disclosed, and is capable of numerous rearrangements, modifications and substitutions without departing from the scope of the present disclosure.

What is claimed is:

1. A computer-implemented method, comprising:
 receiving, from an imaging device, a first frame of a first video stream;

decomposing the first frame into a plurality of portions;
selecting a first portion of the plurality of portions;
determining that the first portion matches, within a predetermined threshold, a sent portion that is stored in a sent catalog;
determining a first identifier associated with the first portion based at least in part on the sent catalog;
sending the first identifier, instead of the first portion, to a server;
selecting a second portion of the plurality of portions;
determining that the second portion fails to match any sent portions that are stored in the sent catalog;
creating a second identifier based at least in part on using the second portion as input to a hashing function;
sending the second identifier with the second portion to the server;
storing the second identifier and the second portion in the sent catalog;
receiving data from the server;
determining that the data includes a third portion of a second frame of a second video stream and an associated third identifier;
storing the third portion and the associated third identifier in a received portion catalog;
determining that the data includes a frame complete indicator; and
generating the second frame based on the received portion catalog, wherein the second frame includes at least the third portion of the second frame and a fourth portion of a third frame.

2. The computer-implemented method of claim 1, further comprising:
sending the second portion to the server.

3. The computer-implemented method of claim 2, further comprising:
associating the second identifier with the second portion.

4. The computer-implemented method of claim 1, wherein the first video stream is H.264 compliant.

5. The computer-implemented method of claim 4, further comprising:
determining that the data includes a fourth identifier; and
retrieving a fourth portion associated with the fourth identifier from the received portion catalog.

6. The computer-implemented method of claim 4, wherein determining that the first portion matches, within the predetermined threshold, the sent portion that is stored in the sent catalog comprises:
comparing the first portion with the sent portion; and
determining that the first portion differs from the sent portion by less than a predetermined number of pixels.

7. The computer-implemented method of claim 4, further comprising:
determining that the data includes a macro identifier; and
retrieving a plurality of received portions from the received portion catalog based at least in part on the macro identifier.

8. One or more non-transitory computer-readable media storing instructions that are executable by one or more processors to perform operations comprising:
receiving, from an imaging device, a first frame of a first video stream;
selecting a first portion of a plurality of portions of the first frame;
determining that the first portion matches, within a predetermined threshold, a sent portion that is included in a sent catalog;
determining a first identifier associated with the first portion based on the sent catalog;
sending the first identifier, instead of the first portion, to a server;
selecting a second portion of the plurality of portions;
determining that the second portion fails to match any sent portions that are stored in the sent catalog;
creating a second identifier based at least in part on using the second portion as input to a hashing function;
sending the second identifier with the second portion to the server;
storing the second identifier and the second portion in the sent catalog;
receiving data from the server;
determining that the data includes a third portion of a second frame of a second video stream and an associated third identifier;
storing the third portion and the associated third identifier in a received portion catalog;
determining that the data includes a frame complete indicator; and
generating the second frame based on the received portion catalog, wherein the second frame includes at least the third portion of the second frame and a fourth portion of a third frame.

9. The one or more non-transitory computer-readable media of claim 8, the operations further comprising:
sending the second portion to the server.

10. The one or more non-transitory computer-readable media of claim 9, the operations further comprising:
associating the second identifier with the second portion.

11. The one or more non-transitory computer-readable media of claim 8, the operations further comprising:
receiving a selection to display complete frames before generating the second frame.

12. The one or more non-transitory computer-readable media of claim 11, the operations further comprising:
determining that the data includes a fourth identifier; and
retrieving a fourth portion associated with the fourth identifier from the received portion catalog.

13. The one or more non-transitory computer-readable media of claim 11, the operations further comprising:
determining that the data includes a macro identifier; and
retrieving a plurality of received portions from the received portion catalog based at least in part on the macro identifier.

14. A computing device, comprising:
one or more processors; and
one or more non-transitory computer-readable media storing instructions that are executable by the one or more processors to perform operations comprising:
receiving, from an imaging device, a first frame of a first video stream;
determining that a first portion of the first frame matches, within a predetermined threshold, a sent portion that is stored in a sent catalog;
determining a first identifier associated with the first portion based on the sent catalog;
sending the first identifier, instead of the first portion, to a server;
selecting a second portion of the first frame;
determining that the second portion fails to match any sent portions that are stored in the sent catalog;
creating a second identifier based at least in part on using the second portion as input to a hashing function;

sending the second identifier with the second portion to the server;

storing the second identifier and the second portion in the sent catalog;

receiving data from the server;

determining that the data includes a third portion of a second frame of a second video stream and an associated third identifier;

storing the third portion and the associated third identifier in a received portion catalog;

determining that the data includes a frame complete indicator; and generating the second frame based on the received portion catalog, wherein the second frame includes the third portion of the second frame and a fourth portion of a third frame.

15. The computing device of claim 14, the operations further comprising:

sending the second portion to the server.

16. The computing device of claim 15, the operations further associating the second identifier with the second portion.

17. The computing device of claim 14, wherein determining that the first portion matches, within the predetermined threshold, the sent portion that is stored in the sent catalog comprises:

comparing the first portion with the sent portion; and determining that the first portion differs from the sent portion by less than a predetermined number of pixels.

18. The computing device of claim 17, the operations further comprising:

determining that the data includes a fifth identifier; and retrieving a fifth portion associated with the fifth identifier from the received portion catalog.

19. The computing device of claim 17, wherein the first video stream has a frame rate of one of fifteen frames per second, thirty frames per second, or sixty frames per second.

20. The computing device of claim 17, the operations further comprising:

determining that the data includes a macro identifier; and retrieving a plurality of received portions from the received portion catalog based at least in part on the macro identifier.

* * * * *